US006979931B1

(12) United States Patent
Gustafson et al.

(10) Patent No.: US 6,979,931 B1
(45) Date of Patent: Dec. 27, 2005

(54) SPINDLE MOTOR HAVING SPINDLE MOTOR STATOR WITH LAMINATE LAYERS FOR INCREASED HEAD STACK ASSEMBLY ACCESS

(75) Inventors: John R. Gustafson, Los Gatos, CA (US); Jonathan M. Garbarino, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/846,078

(22) Filed: Apr. 30, 2001

(51) Int. Cl.[7] .......... H02K 1/12

(52) U.S. Cl. .......... 310/254; 310/216; 310/42; 360/99.08

(58) Field of Search .......... 310/216–218, 310/67 R, 42, 254; 360/99.04, 99.08, 98.07

(56) References Cited

U.S. PATENT DOCUMENTS 5,296,981 A 3/1994 Ogawa
5,528,436 A 6/1996 Peter
5,604,389 A * 2/1997 Nitta et al. .......... 310/67 R
5,798,583 A * 8/1998 Morita .......... 310/42
5,930,076 A * 7/1999 Morita .......... 360/99.08
6,271,988 B1 8/2001 Papst

* cited by examiner

*Primary Examiner*—Dang Le
(74) *Attorney, Agent, or Firm*—Joshua C. Harrison, Esq.; Stetina Brunda Garred & Brucker

(57) ABSTRACT

A spindle motor for use in a disk drive having a rotatable head stack assembly. The spindle motor has a spindle motor hub. The spindle motor further has a magnet radially attached about the spindle motor hub. The spindle motor further has a spindle motor stator. The spindle motor has a stator rim. The spindle motor stator further has a plurality of stator teeth arrayed about and internally extending from the stator rim. The stator teeth are sized to fit about the magnet in operable communication therewith for rotating the spindle motor hub. The stator teeth have laminate layers. The stator teeth have a least one reduced height stator tooth having fewer laminate layers than a remainder of the stator teeth. The reduced height stator tooth is positionable adjacent the head stack assembly for allowing the head stack assembly to pivot over the reduced height stator tooth.

28 Claims, 6 Drawing Sheets

84
84
82
88
84
84
86
84
90
88
26

10
106a
11
102
100
104
94
48b
98a
96
10
108a
11

102
100
96
104
98a
106a
106b
106c
106d
~98b~
~98c~
108a
108b
108c
108d
98d
94

96
100
102

98b
104
108a
108b
108c
108d
~98a~
~98d~
106a
106b
106c
106d
98c
94

SPINDLE MOTOR HAVING SPINDLE MOTOR STATOR WITH LAMINATE LAYERS FOR INCREASED HEAD STACK ASSEMBLY ACCESS

BACKGROUND OF THE INVENTION

CROSS-REFERENCE TO RELATED APPLICATIONS

Not Applicable.

1. Field of the Invention

The present invention relates generally to spindle motors for use in disk drives, and more particularly to a spindle motor having a spindle motor stator with laminate layers for increased head stack assembly access.

2. Description of the Prior Art

The typical hard disk drive includes a disk drive base, and a head disk assembly (HDA) and a printed circuit board assembly (PCBA) attached to the disk drive base. The head disk assembly includes at least one magnetic disk, a spindle motor for rotating the disk, and a head stack assembly (HSA) that includes at least one transducer head, typically several, for reading and writing data to and from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically comprises an actuator body that rotates on a pivot assembly between limited positions, a coil portion that extends from one side of the actuator body to interact with one or more permanent magnets to form a voice coil motor, and one or more actuator arms which that extend from an opposite side of the actuator body. A head gimbal assembly includes at least one transducer head, sometimes two, which is distally attached to each of the actuator arms. The actuator assembly includes the actuator body that has a bore and a pivot bearing cartridge engaged within the bore. The at least one head gimbal assembly and the flex circuit cable assembly are attached to the actuator assembly.

The spindle motor includes a hub that is rotatably attached to the disk drive base. The hub has an outer flange that supports one of the disks. Additional disks may be stacked and separated with spacers. The spindle motor further includes an annular magnet and a spindle motor stator. Where space efficiency is of vital concern, the magnet is typically attached about the lowermost portion of the hub below the flange. The magnet consists of a predetermined number of N and S poles that are disposed alternately circumferentially about the magnet. The spindle motor stator includes an outer rim that is attached to the disk drive base and a plurality of internally facing stator teeth. The stator teeth are equally spaced and extend from the stator rim. The spindle motor stator is sized to fit about the hub and in particular the magnet. Each stator tooth includes windings which selectively conduct current to create a magnetic field that interacts with the various poles of the magnet. Such interaction results in forces applied to the hub which tend to rotate the hub. In those disk drives capable of reading both sides of the disks, the head stack assembly includes an actuator arm that extends and pivots between the vertical region between the lowermost disk and the spindle motor stator. A magnetic shield is provided between the head stack assembly in such region over the stator teeth for protecting against magnetic flux interacting with the magnetic data on the disk and the head stack assembly.

A topic of concern is the desire to reduce the overall disk drive size. Such disk drives may have a variety of applications such as in hand held or portable electronic devices. The exterior size and shape of the disk drive is often referred to as a "form factor". Reduction of such disk drive form factor has proven challenging. This is because the mere reduction of the size of the various disk drive components may result in such components being unable to conform to required specifications and standard form factors for such components, and may result in installation or assembly difficulties.

One particular area of focus is the reduction of the height of the disk drive. As mentioned above, a prior art arrangement includes a lower actuator arm which extends and pivots between the vertical region between the lowermost disk and the spindle motor stator. Such prior arrangement is contemplated to be a limited factor in the overall sizing of the disk drive height. Accordingly, there is a need in the art for an improved spindle motor configuration in comparison to the prior art.

SUMMARY OF THE INVENTION

An aspect of the invention can be regarded as a spindle motor for use in a disk drive having a rotatable head stack assembly. The spindle motor has a spindle motor hub. The spindle motor further has a magnet radially attached about the spindle motor hub. The spindle motor further has a spindle motor stator. The spindle motor stator has a stator rim. The spindle motor stator further has a plurality of stator teeth arrayed about and internally extending from the stator rim. The stator teeth are sized to fit about the magnet in operable communication therewith for rotating the spindle motor hub. The stator teeth have laminate layers. The stator teeth have at least one reduced height stator tooth. The reduced height stator tooth has fewer laminate layers than a remainder of the stator teeth. The reduced height stator tooth is positionable adjacent the head stack assembly for allowing the head stack assembly to pivot over the reduced height stator tooth.

The reduced height stator tooth may have a width greater than a remainder of the stator teeth. The reduced height stator tooth may have a tooth body portion and a distal shoe extending from the tooth body portion. The shoe is disposed adjacent the magnet. Further, the distal shoe may extend vertically beyond the tooth body portion.

According to another aspect of the present invention, there is provided a spindle motor for use in a disk drive having a rotatable head stack assembly. The spindle motor has a spindle motor hub. The spindle motor further has a magnet radially attached about the spindle motor hub. The spindle motor further has a spindle motor stator. The spindle motor stator has a stator rim formed of at least two vertically stacked stator rim laminate layers. The spindle motor stator further has a plurality of stator teeth arrayed about and internally extending from the stator rim. The stator teeth are sized to fit about the magnet in operable communication therewith for rotating the spindle motor hub. The stator teeth are each formed of at least two stator tooth laminate layers. The stator tooth laminate layers are respectively attached to the stator rim laminate layers. The spindle motor stator further has at least one reduced height stator tooth having at least two reduced height stator tooth laminate layers horizontally off-set from and vertically formed towards each other. The reduced height stator tooth being is adjacent the head stack assembly for allowing the head stack assembly to pivot over the reduced height stator tooth.

In addition, the at least two reduced height stator tooth laminate layers may include an upper laminate layer and a lower laminate layer. The upper and lower laminate layers may be horizontally off-set from each other. In another embodiment, the at least one reduced height stator tooth laminate layers include an upper laminate layer, a lower laminate layer, and an inner laminate layer between the upper and lower laminate layers. The upper and lower laminate layers are horizontally off-set from the inner laminate layer. According to another embodiment, the at least two reduced height stator tooth laminate layers include an upper laminate layer and a lower laminate layer. The lower laminate layer extends horizontally from the stator rim and the upper laminate layer is formed towards the lower laminate layer. Further, in another embodiment of the stator motor, all of the stator teeth may take the form of the above described reduced height stator tooth.

According to another aspect of the present invention, there is provided a spindle motor for use in a disk drive having a rotatable head stack assembly. The spindle motor has a spindle motor hub. The spindle motor further has a magnet radially attached about the spindle motor hub. The spindle motor further has a spindle motor stator. The spindle motor stator has a stator rim formed of at least two vertically stacked stator rim laminate layers. The spindle motor stator further has a plurality of stator teeth arrayed about and internally extending from the stator rim. The stator teeth are sized to fit about the magnet in operable communication therewith for rotating the spindle motor hub. The stator teeth have laminate layers formed to a first thickness. The stator teeth have at least one reduced height stator tooth. The reduced height stator tooth has laminate layers formed to a second thickness less than the first thickness. The reduced height stator tooth is positionable adjacent the head stack assembly for allowing the head stack assembly to pivot over the reduced height stator tooth. Further, the reduced height stator tooth may have a width greater than a remainder of the stator teeth.

In additional embodiments of the present invention, there are provided disk drives each having a disk drive base and a head stack assembly. The above-mentioned stator motors may be included the disk drives.

DESCRIPTION OF THE PREFERRED EMBODIMENTS

Figure 1:
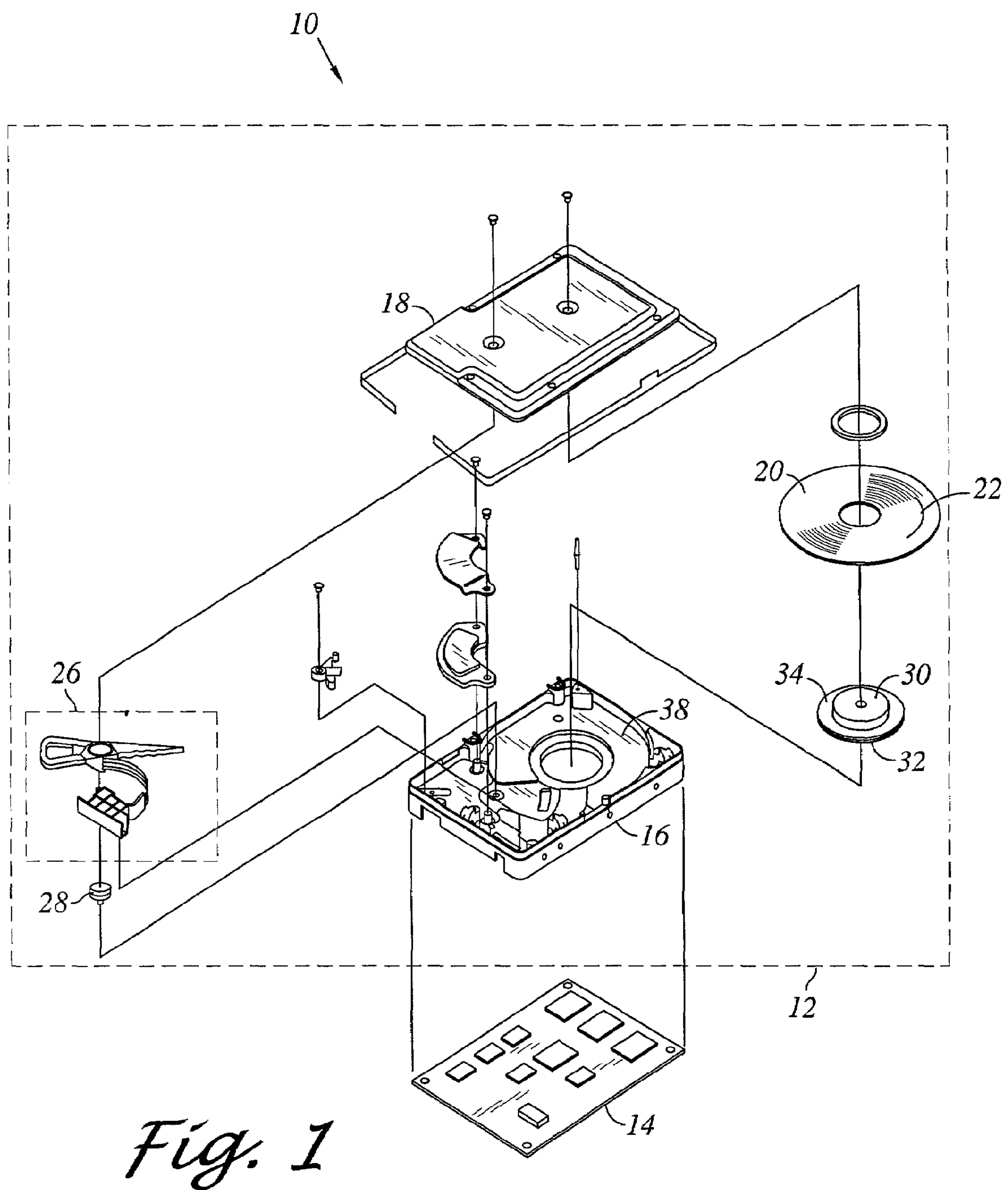
FIG. 1 is an exploded perspective view of a disk drive including a spindle motor as constructed in accordance with an aspect of the present invention.

Referring now to the drawings wherein the showings are for purposes of illustrating preferred embodiments of the present invention only, and not for purposes of limiting the same, FIGS. 1–18 illustrate a disk drive 10 in accordance with the aspects of the present invention.

Figure 2:
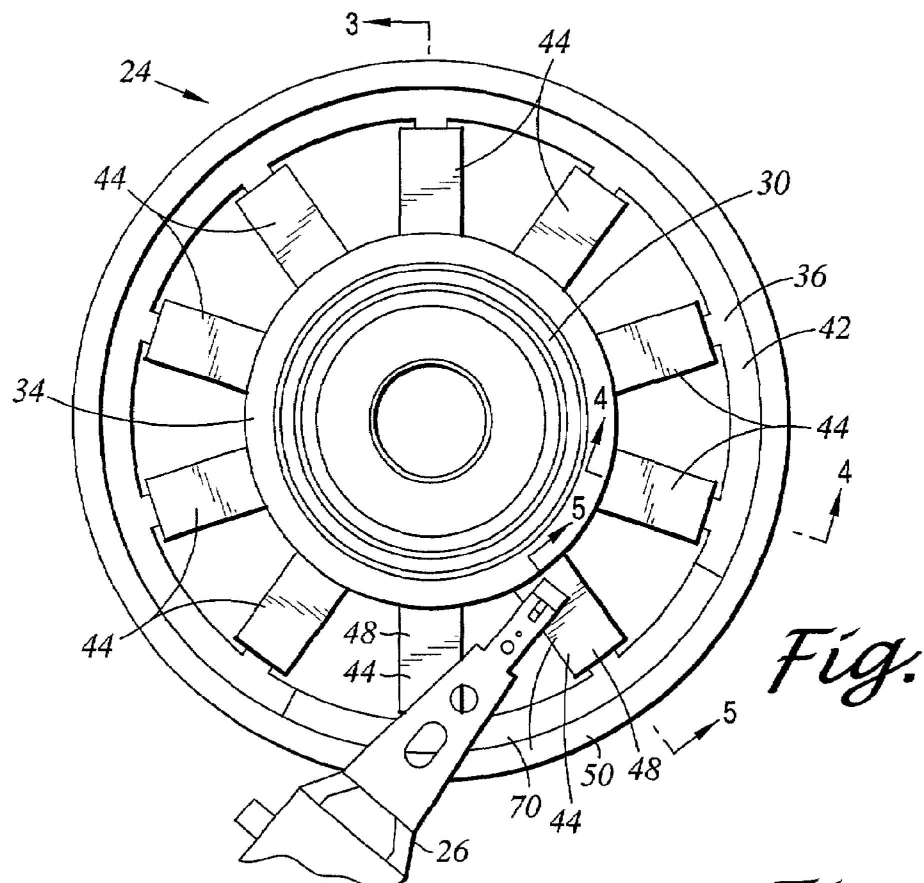
FIG. 2 is a top view of a spindle motor in relation to a portion of the head stack assembly.

Referring now to FIG. 1 there is depicted an exploded perspective view a disk drive 10 constructed in accordance with an aspect of the present invention. The disk drive 10 includes a head disk assembly (HDA) 12 and a printed circuit board assembly (PCBA) 14. The head disk assembly 12 includes a disk drive base 16 and a cover 18 that collectively house at least one magnetic disk 20 (although single disk 20 is shown, multiple disks 20 may be included). The disk 20 contains a plurality of tracks 22 for reading and writing data. The head disk assembly 12 further includes a spindle motor 24 (such as shown in FIG. 2) for rotating the disk 20 and a head stack assembly 26. A pivot cartridge 28 is provided for pivoting the head stack assembly 26 relative to the rotating disk 20 for reading and writing data to and from the disk 20.

Referring additionally to FIGS. 2–5, the spindle motor 24 includes a spindle motor hub 30 and an annular magnet 32 disposed about the hub 30. The hub 30 has an annular flange 34 is configured to support the disk 20. The spindle motor 24 further includes a spindle motor stator 36 (such as shown in FIG. 2) that interacts with the magnet 32 for rotating the spindle motor hub 30 and attached disk 20. Over the spindle motor stator 36, a horizontally disposed magnetic shield 38 is provided which shields the disk 20 and the head stack assembly 26 from magnetic flux generated by the interaction of the magnet 32 and the spindle motor stator 36.

Referring specifically to FIG. 2, there is depicted a top view of the spindle motor 24 according to an aspect of the present invention. In addition, a portion of the head stack assembly 26 is depicted in relation to the spindle motor 24. In order to observe the spindle motor stator 34, the horizontally disposed magnetic shield 38 is not depicted in this view of FIG. 2.

The spindle motor hub 30 has an axis of rotation 40. The spindle motor stator 24 has a stator rim 42 and a plurality of stator teeth 44 arrayed about and internally extending from the stator rim 42 towards the axis of rotation 40. The stator teeth 44 are sized to fit about the magnet 32 in operable communication therewith for rotating the spindle motor hub 30.

The stator teeth 44 have laminate layers 46 (denoted 46*a–d*), as further described below. The stator teeth 44 have at least one reduced height stator tooth 48 (two are shown in FIG. 2). The at least one reduced height stator tooth 48 having fewer laminate layers 58 (denoted 58*c–d*) than a remainder of the stator teeth 44, as further described below. The at least one reduced height stator tooth 48 is positionable adjacent the head stack assembly 26 for allowing the head stack assembly 26 to pivot over the reduced height stator tooth 48.

The spindle motor stator 36 of this embodiment allows the head stack assembly 26 to be effectively translated downward in comparison to prior art stator arrangements which require the stator teeth to have the same number of laminate layers thereof, and therefore the same height. To the extent that the vertical positioning of the head stack assembly 26 is a limiting factor in the overall height form factor of the disk drive 10, such effective translation directly results in facilitating reduction of such overall height form factor.

Figure 3:
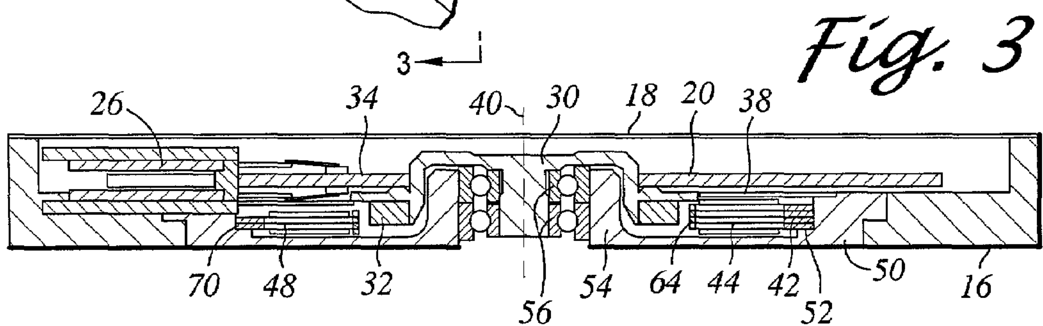
FIG. 3 is a cross sectional view of the disk drive including the spindle motor as seen along axis 3—3 of FIG. 2.

Referring specifically to FIG. 3, there is depicted a cross sectional view of the disk drive 10 including the spindle motor 24 of FIG. 2 as seen along axis 3—3. A stator base 50 may be included having a stepped portion 52 sized and configured to seat the stator rim 42. The stator base 50 is attached to the disk drive base 16. It is contemplated that the stator base 50 may be integrally formed with the disk drive base 16. The spindle motor hub 30 is configured to rotate in relation to the stator base 50. In this regard, in one configuration, an annular member 54 may extend from stator base 50. Bearing sets 56 may be provided which are mounted within the spindle motor hub 30 in communication with the annular member 54 for facilitating rotation of the hub 30.

Figure 4:
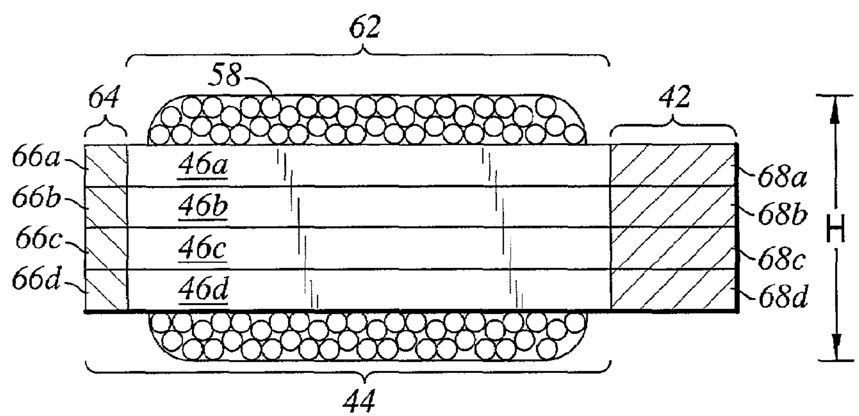
FIG. 4 is a cross sectional view of a stator tooth as seen along axis 4—4 of FIG. 2.

Referring now to FIG. 4, there is depicted a cross sectional view of one of the stator teeth 44, as seen along axis 4—4 of FIG. 2. The stator tooth 44 is representative of a remainder of the stator teeth 44. In this regard, each of the stator teeth 44 includes windings 58 thereabout. The windings 58 of each of the stator teeth 44 selectively conduct current to create a magnetic field that interacts with various poles of the magnet 32. Such interaction results in forces applied to the spindle motor hub 30 which tend to rotate the spindle motor hub 30. The windings 58 have a total vertical height H.

The each of the stator teeth 44 may have a tooth body portion 62 extending from the stator rim 42 and a distal shoe 64 extending from the tooth body portion 62. As mentioned above, the stator teeth 44 include laminate layers 46*a–d* (at least two are required). In this regard, the laminate layers 46*a–d* form the tooth body portion 62. Further, the distal shoe 64 may be formed of laminate layers 66*a–d*. Such laminate layers 66*a–d* are aligned with the laminate layers 46*a–d* and may be integrally formed with the same. Further the stator rim 42 may be formed of may be formed of laminate layers 68*a–d*. Such laminate layers 68*a–d* are aligned with the laminate layers 46*a–d* and may be integrally formed with the same.

Figure 5:
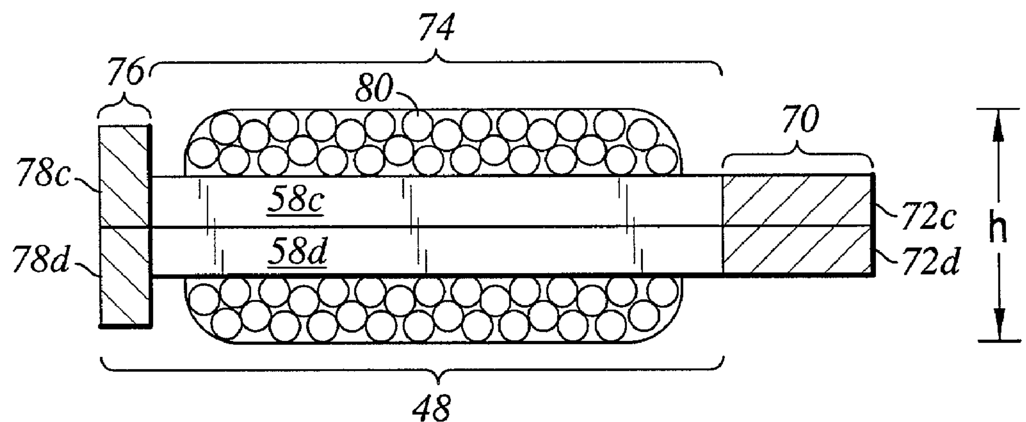
FIG. 5 is a cross sectional view of a reduced height stator tooth as seen along axis 5—5 of FIG. 2.
Figure 6:
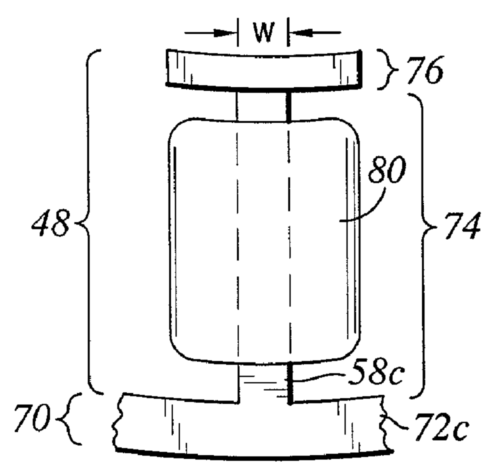
FIG. 6 is top view of the reduced height stator tooth of FIG. 5.

The stator rim 42 may include a reduced height segment 70. The reduced height segment 70 may be formed of laminate layers 72*c–d* which are aligned with laminate layers 68*c–d*. Referring additionally to FIG. 5, there is depicted a cross sectional view of the reduced height stator tooth 48 as seen along axis 5—5 of FIG. 2. FIG. 6 is a top view of the reduced height stator tooth 48 of FIG. 5. Each reduced height stator tooth 48 may have a tooth body portion 74 extending from the reduced height segment 70 and a distal shoe 76 extending from the tooth body portion 74. The distal shoe 76 is disposed adjacent the magnet 32. The laminate layers 72*c–d* form the tooth body portion 74. The distal shoe 76 may be formed of laminate layers 78*c–d*. Such laminate layers 78*c–d* are aligned with the laminate layers 72*c–d* and may be integrally formed with the same. Windings 80 are formed about the tooth body portion 74. Further, the distal shoe 76 may extend vertically beyond the tooth body portion 74.

It is contemplated that the motor torque constant of the spindle motor 24 is a function of the number of stator teeth 44, flux density through each of the stator teeth 44, the number of windings 64 about each stator tooth 44, and the radial distance between the stator tooth 44 and the magnet 30. In this regard, the flux density through each of the stator teeth 44 is a function of the surface area of portion of the stator tooth 44 adjacent the magnet 30. In this regard, so as to increase such area, the laminate layers 78*c–d* of the distal shoe 76 may each respectively have a height greater than a height of the laminate layers 58*c–d* of the tooth body portion 74.

Figure 7:
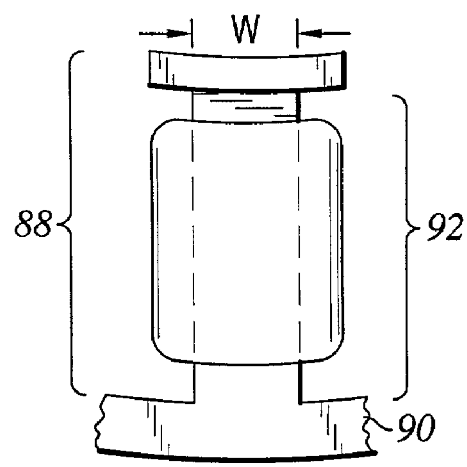
FIG. 7 is a top view of a reduced height stator tooth having an increased width according to another aspect of the present invention.
Figure 8:
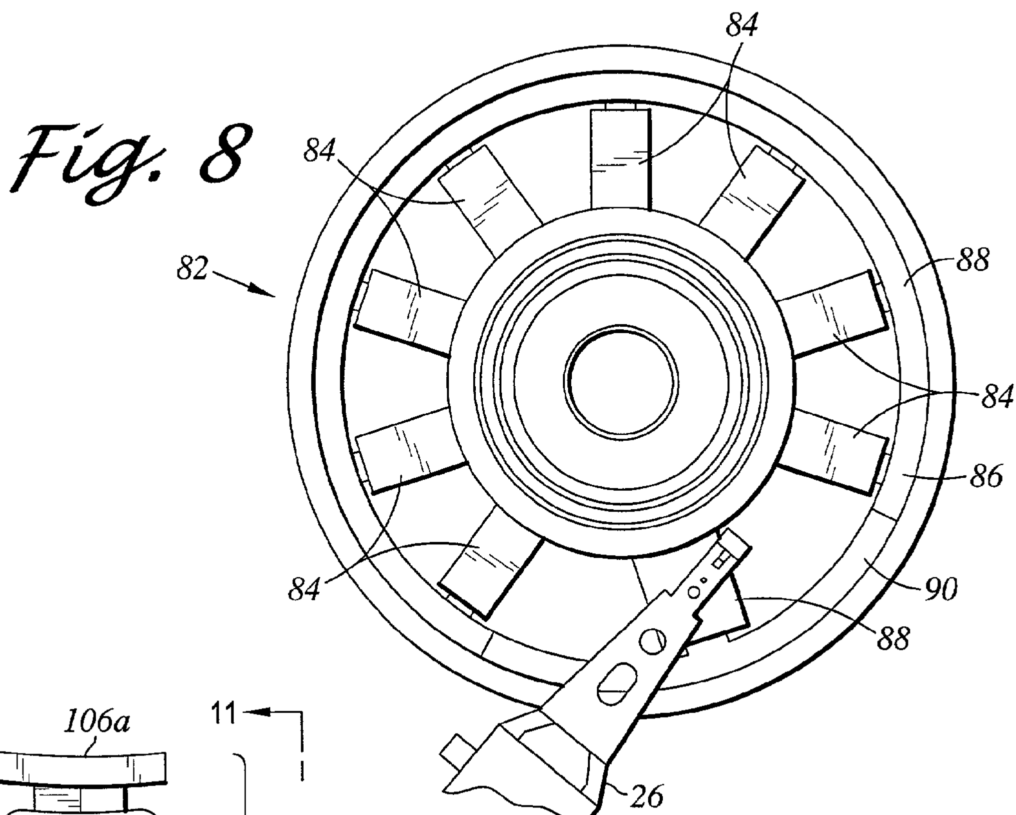
FIG. 8 is a top view of a spindle motor as including the reduced height stator tooth of FIGS. 7.

Referring now to FIGS. 7 and 8, there is depicted another embodiment of a spindle motor stator 82. The spindle motor 82 is similar to the above described spindle motor 24, however the reduced height stator teeth 48 are replace with a reduced height stator tooth 86. In this regard, the spindle motor 82 includes stator teeth 84 and a stator rim 86 similar to the above described stator teeth 44 and the stator rim 42. Further, the stator rim 86 includes a reduced height segment 90 similar to the reduced height segment 70. The reduced height stator tooth 88 is similar in configuration to the reduced height stator tooth 48, however, the reduced height stator tooth 48 has a tooth body portion 92 having a width (W) greater than a remainder of the stator teeth 44. In this regard, the cross sectional area through which magnetic flux may flow is relatively increased.

Figure 9:
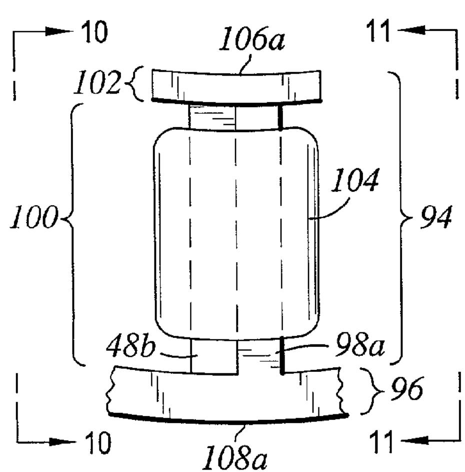
FIG. 9 a top view of a reduced height stator tooth having horizontally off-set laminate layers according to another aspect of the present invention.
Figure 10:
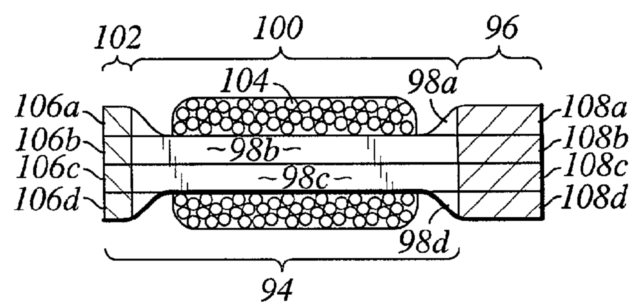
FIG. 10 is a side view of the reduced height stator tooth as seen along axis 10—10 of FIG. 9.
Figure 11:
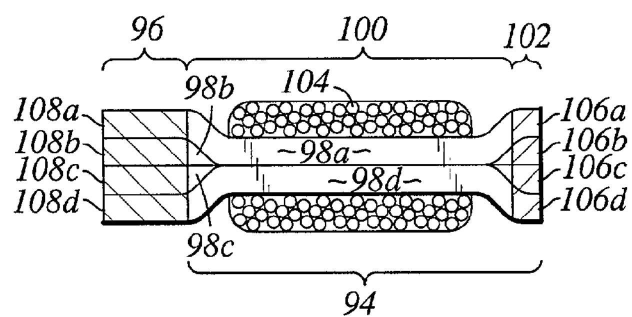
FIG. 11 is a side view of the reduced height stator tooth as seen along axis 11—11 of FIG. 9.

Referring now to FIGS. 9–11, there is depicted another embodiment of a reduced height stator tooth 94 which may be incorporated into a spindle motor similar in other respects to the spindle motor 24. The reduced height stator tooth 94 extends from a stator rim 96 similar to the stator rim 42. Multiple reduced height stator teeth 94 may be utilized. The reduced height stator tooth 94 has at least two reduced height stator tooth laminate layers (such as 98*a* and 98*b*, 98*a* and 98*c*, 98*b* and 98*d*, 98*c* and 98*d*) horizontally off-set from and vertically formed towards each other. As depicted, four reduced height stator tooth laminate layers 98*a–d* are provided. The reduced height stator tooth 94 is positionable adjacent the head stack assembly 26 for allowing the head stack assembly 26 to pivot over the reduced height stator tooth 94. The reduced height stator tooth laminate layer 98*a* is an upper laminate layer, the reduced height stator tooth laminate layer 98*d* is a lower laminate layer, and the reduced height stator tooth laminate layers 98*b–c* are inner laminate layers which are interposed between the upper and lower laminate layers. As can be seen, the reduced height stator tooth laminate layers 98*a*, 98*d* are horizontally off-set from the reduced height stator tooth laminate layers 98*b–c*. Further, the reduced height stator tooth laminate layers 98*a*, 98*d* are formed towards each other. As such, as used herein, the language, formed towards each other, refers to at least one of the laminate layers being formed towards another laminate layer. Thus, laminate layer 98*a* is considered to be formed towards laminate layers 98*b–d*. The reduced height stator tooth 94 includes a tooth body portion 100 and distal shoe 102. The tooth body portion 100 is formed of the laminate layers 98*a–d*. Windings 104 are formed about the tooth body portion 100. The distal shoe 102 is formed of laminate layers 106*a–d* which are attached to and may be integrally formed with laminate layers 98*a–d*. The stator rim 96 is formed of laminate layers 108*a–d* which are attached to and may be integrally formed with laminate layers 98*a–d*.

Figure 12:
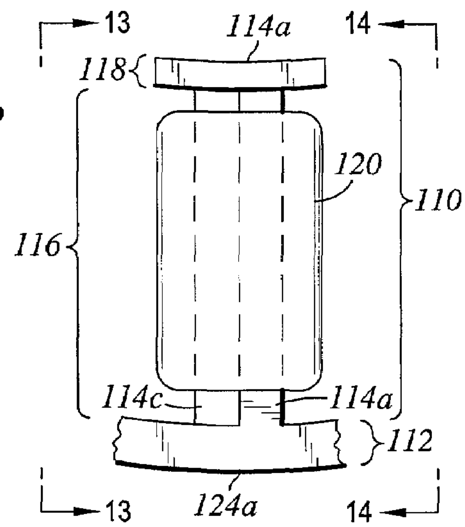
FIG. 12 a top view of a reduced height stator tooth having horizontally off-set laminate layers according to another aspect of the present invention.
Figure 13:
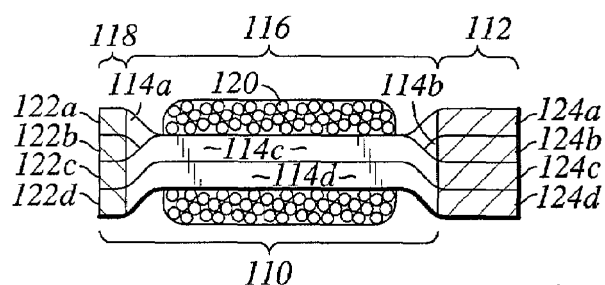
FIG. 13 is a side view of the reduced height stator tooth as seen along axis 13—13 of FIG. 12.
Figure 14:
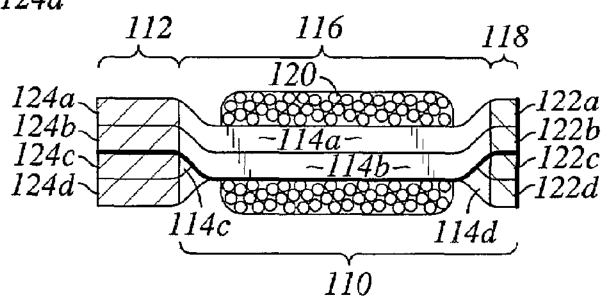
FIG. 14 is a side view of the reduced height stator tooth as seen along axis 14—14 of FIG. 12.

Referring now to FIGS. 12–14, there is depicted another embodiment of a reduced height stator tooth 110 which may be incorporated into a spindle motor similar in other respects to the spindle motor 24. The reduced height stator tooth 110 extends from a stator rim 112 similar to the stator rim 42. Multiple reduced height stator teeth 110 may be utilized. The reduced height stator tooth 110 has at least two reduced height stator tooth laminate layers (such as 114*a* and 114*c*, 114*a* and 114*d*, 114*b* and 114*c*, 114*b* and 114*d*) horizontally off-set from and vertically formed towards each other. As depicted, four reduced height stator tooth laminate layers 114*a–d* are provided. The reduced height stator tooth 110 is positionable adjacent the head stack assembly 26 for allowing the head stack assembly 26 to pivot over the reduced height stator tooth 110. The reduced height stator tooth laminate layer 114*a* is an upper laminate layer, the reduced height stator tooth laminate layer 114*d* is a lower laminate layer, and the reduced height stator tooth laminate layers 114*b–c* are inner laminate layers which are interposed between the upper and lower laminate layers. As can be seen, the reduced height stator tooth laminate layers 14*a–b* are horizontally off-set from the reduced height stator tooth laminate layers 114*c–d*. Further, the reduced height stator tooth laminate layers 114*a*, 114*d* are formed towards each other. The reduced height stator tooth 110 includes a tooth body portion 116 and distal shoe 118. The tooth body portion 116 is formed of the laminate layers 114*a–d*. Windings 120 are formed about the tooth body portion 116. The distal shoe 118 is formed of laminate layers 122*a–d* which are attached to and may be integrally formed with laminate layers 114*a–d*. The stator rim 112 is formed of laminate layers 1124*a–d* which are attached to and may be integrally formed with laminate layers 114*a–d*.

Figure 15:
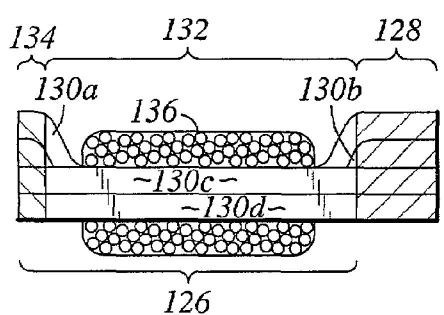
FIG. 15 is a side view of a reduced height stator tooth having horizontally off-set laminate layers the lower layers of which extending horizontally according to another aspect of the present invention.
Figure 16:
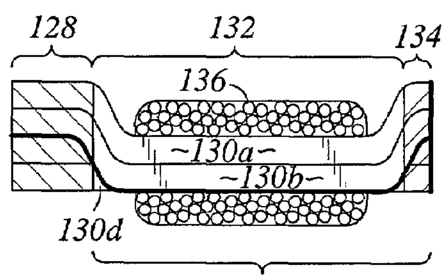
FIG. 16 is an opposing side view of the reduced height stator tooth of FIG. 15.

Referring now to FIGS. 15–16, there is depicted another embodiment of a reduced height stator tooth 126 which may be incorporated into a spindle motor similar in other respects to the spindle motor 24. The reduced height stator tooth 126 extends from a stator rim 128 similar to the stator rim 42. Multiple reduced height stator teeth 126 may be utilized. The reduced height stator tooth 126 is formed of reduced height stator tooth laminate layers 130*a–d*. The reduced height stator tooth 126 is similar in configuration to the reduced height stator tooth 126, however, laminate layers 130*c–d* are formed to extend horizontally from the stator rim 128. The reduced height stator tooth 126 is positionable adjacent the head stack assembly 26 for allowing the head stack assembly 26 to pivot over the reduced height stator tooth 126. The reduced height stator tooth laminate layer 130*a* is an upper laminate layer, the reduced height stator tooth laminate layer 130*d* is a lower laminate layer, and the reduced height stator tooth laminate layers 130*b–c* are inner laminate layers which are interposed between the upper and lower laminate layers. As can be seen, the reduced height stator tooth laminate layers 130*a–b* are horizontally off-set from the reduced height stator tooth laminate layers 130*c–d*. Further, the reduced height stator tooth laminate layers 130*a*, 130*d* are formed towards each other. As such, as used herein, the language, formed towards each other, refers to at least one of the laminate layers being formed towards another laminate layer. Thus, laminate layer 130*a* is considered to be formed towards laminate layers 130*c–d*. The reduced height stator tooth 126 includes a tooth body portion 132 and distal shoe 134. Windings 136 are formed about the tooth body portion 132. As such, in comparison the reduced height stator tooth 110, the configuration of the present reduced height stator tooth 126 facilitates the head stack assembly 26 to be more closely positioned adjacent the reduced height stator tooth 126.

In another embodiment of the spindle motor stator 24, all of the stator teeth 44 may take the form of the above described reduced height stator tooth 126.

Figure 17:
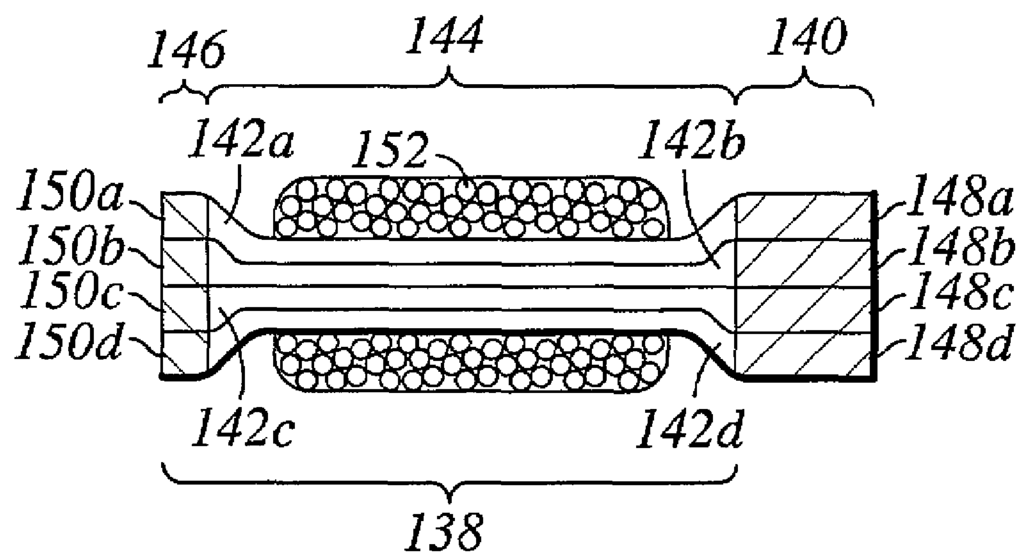
FIG. 17 is a reduced height stator tooth having a reduced height laminate layers according to another aspect of the present invention.
Figure 18:
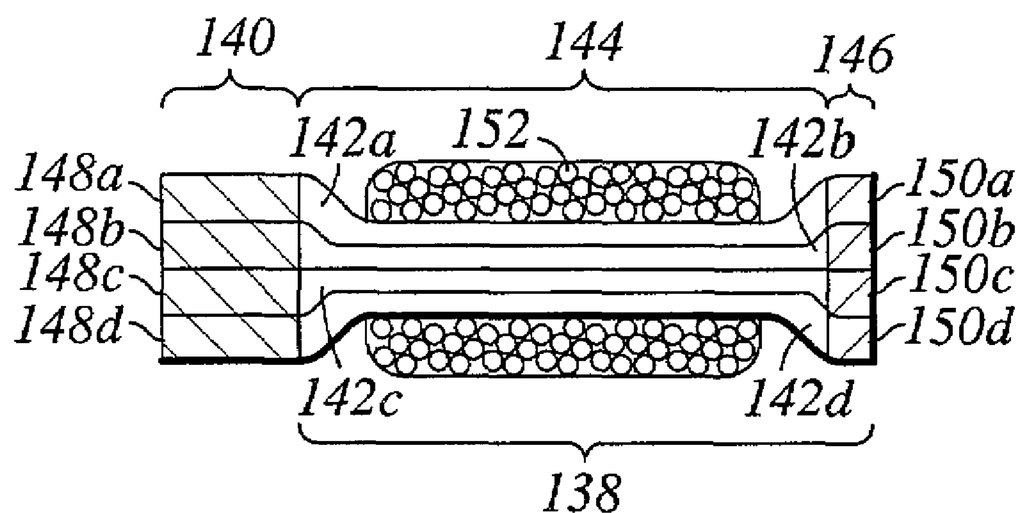
FIG. 18 is an opposing side view of the reduced height stator tooth of FIG. 17.

Referring now to FIGS. 17–18, there is depicted another embodiment of a reduced height stator tooth 138 which may be incorporated into a spindle motor similar in other respects to the spindle motor 24. The reduced height stator tooth 138 extends from a stator rim 140 similar to the stator rim 42. Multiple reduced height stator teeth 138 may be utilized. The reduced height stator tooth 138 is formed of reduced height stator tooth laminate layers 142*a–d*. The reduced height stator tooth 138 is similar in configuration to the stator teeth 44, however, laminate layers 142*a–d* are formed to a thickness less than a thickness of the stator teeth 44. The reduced height stator tooth 138 is positionable adjacent the head stack assembly 26 for allowing the head stack assembly 26 to pivot over the reduced height stator tooth 138. Because of such relatively lessened thickness, the configuration of the present reduced height stator tooth 138 facilitates the head stack assembly 26 to be more closely positioned adjacent the reduced height stator tooth 138. The reduced height stator tooth 138 includes a tooth body portion 144 and distal shoe 146. Windings 152 are formed about the tooth body portion 144. The stator rim 140 is formed of laminate layers 148 which are attached to and may be integrally formed with laminate layers 142*a–d*. Further, the distal shoe 146 is formed of laminate layers 150*a–d*. It is contemplated that the stator rim 140, tooth body portion 144 and distal shoe 146 may be initially formed to be of a similar thickness or height. Subsequently, the tooth body portion 144 may undergo a forming process to achieve such relatively reduced thickness. In addition, it is contemplated that the width of the tooth body portion 144 may be greater than the width of the stator teeth 44.

In another embodiment of the spindle motor stator 24, all of the stator teeth 44 may take the form of the above described reduced height stator tooth 138.

What is claimed is:

1. A spindle motor for use in a disk drive having a rotatable head stack assembly, the spindle motor comprising:

- a spindle motor hub defining an axis of rotation;
- a magnet radially attached about the spindle motor hub; and
- a spindle motor stator including:
  - a stator rim; and
  - a plurality of stator teeth arrayed about and internally extending from the stator rim, the stator teeth being sized to fit about the magnet in operable communication therewith for rotating the spindle motor hub, the stator teeth having laminate layers, the stator teeth having at least one reduced height stator tooth, the reduced height stator tooth having fewer laminate layers than a remainder of the stator teeth, the reduced height stator tooth being positionable adjacent the head stack assembly in a direction parallel to the axis of rotation for allowing the head stack assembly to pivot over the reduced height stator tooth.

2. The spindle motor of claim 1 wherein the reduced height stator tooth has a width greater than a remainder of the stator teeth.

3. The spindle motor of claim 1 wherein the reduced height stator tooth has a tooth body portion and a distal shoe extending from the tooth body portion, the shoe is disposed adjacent the magnet.

4. The spindle motor of claim 3 wherein the distal shoe extends vertically beyond the tooth body portion.

5. A spindle motor for use in a disk drive having a rotatable head stack assembly, the spindle motor comprising:

a spindle motor hub;

a magnet radially attached about the spindle motor hub; and a spindle motor stator including:

a stator rim formed of at least two vertically stacked stator rim laminate layers;

a plurality of stator teeth arrayed about and internally extending from the stator rim, the stator teeth being sized to fit about the magnet in operable communication therewith for rotating the spindle motor hub, the stator teeth each being formed of at least two stator tooth laminate layers, the stator tooth laminate layers being respectively attached to the stator rim laminate layers; and at least one reduced height stator tooth having at least two reduced height stator tooth laminate layers horizontally off-set from and vertically formed towards each other, the reduced height stator tooth being positionable adjacent the head stack assembly for allowing the head stack assembly to pivot over the reduced height stator tooth.

6. The spindle motor of claim 5 wherein the at least two reduced height stator tooth laminate layers include an upper laminate layer and a lower laminate layer, the upper and lower laminate layers are horizontally off-set from each other.

7. The spindle motor of claim 5 wherein the at least one reduced height stator tooth laminate layers include an upper laminate layer, a lower laminate layer, and an inner laminate layer between the upper and lower laminate layers, the upper and lower laminate layers are horizontally off-set from the inner laminate layer.

8. The spindle motor of claim 5 wherein the at least two reduced height stator tooth laminate layers include an upper laminate layer and a lower laminate layer, the lower laminate layer extends horizontally from the stator rim, the upper laminate layer is formed towards the lower laminate layer.

9. A spindle motor for use in a disk drive having a rotatable head stack assembly, the spindle motor comprising:

a spindle motor hub;

a magnet radially attached about the spindle motor hub; and a spindle motor stator including:

a stator rim formed of at least two vertically stacked stator rim laminate layers;

at least one stator tooth internally extending from the stator rim, the stator tooth being sized to fit about the magnet in operable communication therewith for rotating the spindle motor hub, the stator tooth being formed of at least two stator tooth laminate layers horizontally off-set from and vertically formed towards each other, the stator tooth laminate layers being respectively attached to the stator rim laminate layers, the stator tooth being positionable adjacent the head stack assembly for allowing the head stack assembly to pivot over the stator tooth.

10. The spindle motor of claim 9 wherein the stator tooth laminate layers include an upper laminate layer and a lower laminate layer, the upper and lower laminate layers are horizontally off-set from each other.

11. The spindle motor of claim 9 wherein the stator tooth laminate layers include an tipper laminate layer, a lower laminate layer, and an inner laminate layer between the upper and lower laminate layers, the upper and lower laminate layers are horizontally off-set from the inner laminate layer.

12. The spindle motor of claim 9 wherein the stator tooth laminate layers include an upper laminate layer and a lower laminate layer, the lower laminate layer extends horizontally from the stator rim, the upper laminate layer is formed towards the lower laminate layer.

13. A spindle motor for use in a disk drive having a rotatable head stack assembly, the spindle motor comprising:

a spindle motor hub defining an axis of rotation;

a magnet radially attached about the spindle motor hub; and a spindle motor stator including:

a stator rim; and a plurality of stator teeth arrayed about and internally extending from the stator rim, the stator teeth being sized to fit about the magnet in operable communication therewith for rotating the spindle motor hub, the stator teeth having laminate layers formed to a first thickness, the stator teeth having at least one reduced height stator tooth, the reduced height stator tooth having laminate layers formed to a second thickness less than the first thickness, the reduced height stator tooth being positionable adjacent the head stack assembly in a direction parallel to the axis of rotation for allowing the head stack assembly to pivot over the reduced height stator tooth.

14. The spindle motor of claim 13 wherein the reduced height stator tooth has a width greater than a remainder of the stator teeth.

15. A disk drive comprising:

a disk drive base;

a head stack assembly rotatably attached to the disk drive base; and a spindle motor attached to the disk drive base including:

a spindle motor hub defining an axis of rotation;

a magnet radially attached about the spindle motor hub; and a spindle motor stator including:

a stator rim; and a plurality of stator teeth arrayed about and internally extending from the stator rim, the stator teeth being sized to fit about the magnet in operable communication therewith for rotating the spindle motor hub, the stator teeth having laminate layers, the stator teeth having at least one reduced height stator tooth, the reduced height stator tooth having fewer laminate layers than a remainder of the stator teeth, the reduced height stator tooth being positionable adjacent the head stack assembly in a direction parallel to the axis of rotation for allowing the head stack assembly to pivot over the reduced height stator tooth.

16. The disk drive of claim 15 wherein the reduced height stator tooth has a width greater than a remainder of the stator teeth.

17. The disk drive of claim 15 wherein the reduced height stator tooth has a tooth body portion and a distal shoe extending from the tooth body portion, the shoe is disposed adjacent the magnet.

18. The disk drive of claim 17 wherein the distal shoe extends vertically beyond the tooth body portion.

19. A disk drive comprising:
- a disk drive base;
- a head stack assembly rotatably attached to the disk drive base; and
- a spindle motor attached to the disk drive base including:
  - a spindle motor hub;
  - a magnet radially attached about the spindle motor hub; and
  - a spindle motor stator including:
    - a stator rim formed of at least two vertically stacked stator rim laminate layers;
    - a plurality of stator teeth arrayed about and internally extending from the stator rim, the stator teeth being sized to fit about the magnet in operable communication therewith for rotating the spindle motor hub, the stator teeth each being formed of at least two stator tooth laminate layers, the stator tooth laminate layers being respectively attached to the stator rim laminate layers; and
    - at least one reduced height stator tooth having at least two reduced height stator tooth laminate layers horizontally off-set from and vertically formed towards each other, the reduced height stator tooth being positionable adjacent the head stack assembly for allowing the head stack assembly to pivot over the reduced height stator tooth.

20. The disk drive of claim 19 wherein the at least two reduced height stator tooth laminate layers include an upper laminate layer and a lower laminate layer, the upper and lower laminate layers are horizontally off-set from each other.

21. The disk drive of claim 19 wherein the at least one reduced height stator tooth laminate layers include an upper laminate layer, a lower laminate layer, and an inner laminate layer between the upper and lower laminate layers, the upper and lower laminate layers are horizontally off-set from the inner laminate layer.

22. The disk drive of claim 19 wherein the at least two reduced height stator tooth laminate layers include an upper laminate layer and a lower laminate layer, the lower laminate layer extends horizontally from the stator rim, the upper laminate layer is formed towards the lower laminate layer.

23. A disk drive comprising:
- a disk drive base;
- a head stack assembly rotatably attached to the disk drive base; and
- a spindle motor attached to the disk drive base including:
  - a spindle motor hub;
  - a magnet radially attached about the spindle motor hub; and
  - a spindle motor stator including:
    - a stator rim formed of at least two vertically stacked stator rim laminate layers;
    - at least one stator tooth internally extending from the stator rim, the stator tooth being sized to fit about the magnet in operable communication therewith for rotating the spindle motor hub, the stator tooth being formed of at least two stator tooth laminate layers horizontally off-set from and vertically formed towards each other, the stator tooth laminate layers being respectively attached to the stator rim laminate layers, the stator tooth being positionable adjacent the head stack assembly for allowing the head stack assembly to pivot over the stator tooth.

24. The disk drive of claim 23 wherein the stator tooth laminate layers include an upper laminate layer and a lower laminate layer, the upper and lower laminate layers are horizontally off-set from each other.

25. The disk drive of claim 23 wherein the stator tooth laminate layers include an upper laminate layer, a lower laminate layer, and an inner laminate layer between the upper and lower laminate layers, the upper and lower laminate layers are horizontally off-set from the inner laminate layer.

26. The disk drive of claim 23 wherein the stator tooth laminate layers include an upper laminate layer and a lower laminate layer, the lower laminate layer extends horizontally from the stator rim, the upper laminate layer is formed towards the lower laminate layer.

27. A disk drive comprising:
- a disk drive base;
- a head stack assembly rotatably attached to the disk drive base; and
- a spindle motor attached to the disk drive base including:
  - a spindle motor hub defining an axis of rotation;
  - a magnet radially attached about the spindle motor hub; and
  - a spindle motor stator including:
    - a stator rim; and
    - a plurality of stator teeth arrayed about and internally extending from the stator rim, the stator teeth being sized to fit about the magnet in operable communication therewith for rotating the spindle motor hub, the stator teeth having laminate layers formed to a first thickness, the stator teeth having at least one reduced height stator tooth, the reduced height stator tooth having laminate layers formed to a second thickness less than the first thickness, the reduced height stator tooth being positionable adjacent the head stack assembly in a direction parallel to the axis of rotation for allowing the head stack assembly to pivot over the reduced height stator tooth.

28. The disk drive of claim 27 wherein the reduced height stator tooth has a width greater than a remainder of the stator teeth.

* * * * *